United States Patent [19]
Ando

[11] Patent Number: 5,299,556
[45] Date of Patent: Apr. 5, 1994

[54] SELF-HEATING CONTAINER

[75] Inventor: Koki Ando, Tokyo, Japan

[73] Assignee: Nissin Shokuhin Kabushiki Kaisha, Japan

[21] Appl. No.: 525,464

[22] Filed: May 18, 1990

[30] Foreign Application Priority Data

May 25, 1989 [JP] Japan .................. 1-61019[U]

[51] Int. Cl.⁵ .............................................. F24J 1/00
[52] U.S. Cl. .................................. 126/263 R; 126/261; 126/262
[58] Field of Search ............ 126/263, 204, 262, 271.3, 126/261; 44/3.1; 62/4; 206/222, 219; 426/109; 220/3.1, 412

[56] References Cited

U.S. PATENT DOCUMENTS

| | | | |
|---|---|---|---|
| 2,384,278 | 9/1945 | Caldwell | 126/263 X |
| 2,531,548 | 11/1950 | Bennett | 126/263 |
| 4,013,061 | 3/1977 | Trumble et al. | 126/263 X |
| 4,043,314 | 8/1977 | Trumble et al. | 126/263 |
| 4,664,674 | 5/1987 | Oftedal et al. | 126/263 X |

FOREIGN PATENT DOCUMENTS

| | | |
|---|---|---|
| 0356141 | 2/1990 | European Pat. Off. . |
| 2102653 | 4/1972 | France . |
| 280418 | 5/1952 | Switzerland . |
| 1341869 | 12/1973 | United Kingdom . |

OTHER PUBLICATIONS

Hitachi Seisakusho K.K.–"Automatic Firing Device of Gas Burner for Welding"–May 10, 1983–Patent Abstract of Japan (vol. 7, No. 106).

Primary Examiner—Larry Jones
Attorney, Agent, or Firm—Marshall, O'Toole, Gerstein, Murray & Borun

[57] ABSTRACT

A self-heating container comprises an outer casing (56) having a bottom wall (60) an inner casing (64) secured within the outer casing and a heat-generating material (72) contained in the inner casing. The container includes also a vertical shaft (38) journalled within the inner casing and having a lower end extending out of the bottom wall of the outer casing, a sparking wheel (36) having an abrasive surface and secured to the shaft adjacent the heat-generating material and a flint (40) supported by the inner casing and pressed against the abrasive surface to generate sparks when the wheel is caused to rotate. A horizontal shaft (82) is journalled to the outer casing and adapted to be rotated, and gear means (78,80) couples the vertical shaft (38) and the horizontal shaft (82).

4 Claims, 2 Drawing Sheets

SELF-HEATING CONTAINER

BACKGROUND OF THE INVENTION

This invention relates to a self-heating container of the type which may be used particularly for food and beverages.

Japanese utility model early publications S.62-146427 and S.63-42089 both exemplify conventional heating containers utilizing the heat generated by the self-combustion of a heat-generating material comprising a mixture of a combustible substance and an oxidising agent. The heat-generating material is ignited by means of an electric filament or a fuse connected to the heat-generating material. Ignition requires a match, a lighter, a battery or other ignition means, all of which are inconvenient to use.

SUMMARY OF THE INVENTION

The present invention seeks to provide a compact and portable self-heating container which can be easily, safely and reliably ignited whether indoors or out without requiring a match, lighter, battery or the like, and which can be heated quickly.

According to the invention, there is provided a self-heating container which comprises an outer casing having a bottom wall, an inner casing secured within the outer casing, a heat-generating material contained in the inner casing, a vertical shaft journalled within the inner casing and having a lower end extending out of the bottom wall of the outer casing, a sparking wheel having an abrasive surface and secured to the shaft adjacent the heat-generating material and a flint supported by the inner casing and pressed against the abrasive surface to generate sparks when the wheel is caused to rotate, characterised by a horizontal shaft journalled to the outer casing and adapted to be rotated, and gear means for coupling the vertical shaft and the horizontal shaft.

The horizontal shaft suitably extends out of the casing where it can be rotated to generate a spark and ignite the heat-generating material. As a safety feature the horizontal shaft can be of two part construction and the two parts can be connected together immediately before use.

BRIEF DESCRIPTION OF THE DRAWINGS

The invention will now be described in greater detail by way of example only with reference to the accompanying drawings, in which.

DESCRIPTION OF THE PREFERRED EMBODIMENTS

Figure 1:
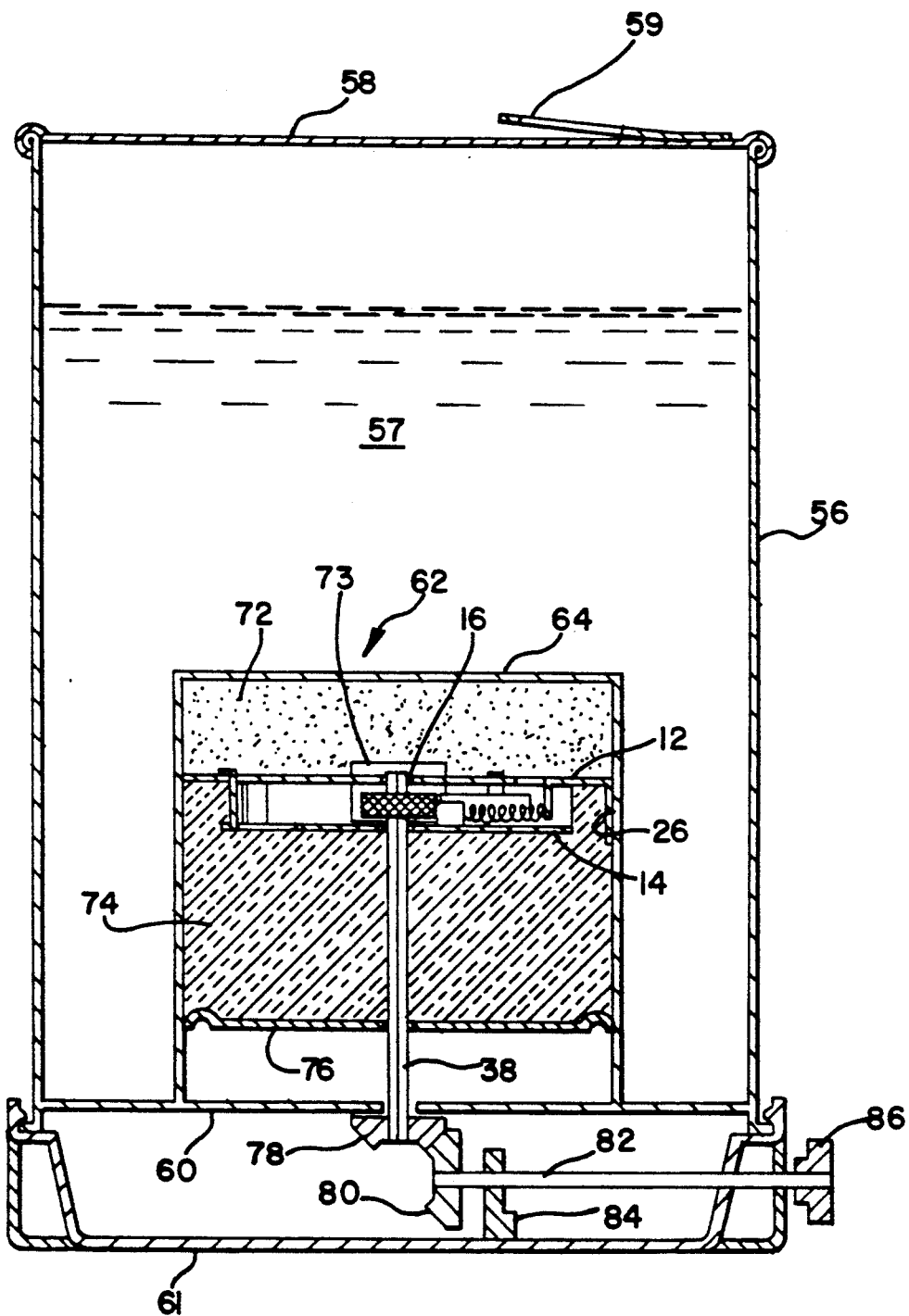
FIG. 1 is a side view in vertical section of a beverage container according to the invention.

With reference to FIG. 1, the container includes an outer cylindrical metal can 56 containing beverage 57 and having a top closure 58 which is removable by pulling a pull ring 59, and a bottom plate 60. The container further includes a bottom cover 61. The container accommodates a heater 62 having a cylindrical metal casing 64, the lower end of which is secured to the bottom plate 60.

The heater 62 contains a heat-generating material 72, an ignition agent 73 fixed to the heat-generating material, an ignition system which will be described in detail below, and a thermal insulator 74 held in place by a compressing cover 76.

The heat-generating material 72 is a self-burning type heat-generating agent, which may be a mixture of an oxidizing agent and a combustible material. The oxidizing agent may be one or more of iron oxide, copper oxide, lead oxide and other metal oxides. The combustible material may be either an elemental or an alloy form of titanium, iron or other metal, or silicon or other metalloid, which has a higher heat of oxidation than that of the metal forming the oxidizing agent. When the combustible material obtains oxygen from the oxidizing agent and is oxidized, a large amount of oxidation heat is therefore generated.

The ignition agent 73 may be a mixture of an oxidizing agent and a combustible material, which is easier to ignite than the heat-generating material. The oxidizing agent may be one or more of barium peroxide, copper oxide and strontium peroxide. The combustible material may be either an elemental or an alloy form of magnesium, aluminum, calcium or boron. When the combustible material is oxidized by the oxidizing agent, a large amount of oxidation heat is generated.

The heat-generating material 72 requires a great amount of heat to be ignited and cannot be ignited by, for example, a match or a lighter. In contrast, the ignition agent 73 requires less heat for ignition than the heat-generating material 72, and can be ignited at a lower temperature and/or in a shorter time. For that reason, the ignition agent 73 can be easily ignited by the small quantity of sparks generated by the ignition system. The heat-generating material 72 can then be ignited by the heat generated by the ignition agent 73.

Figure 2:
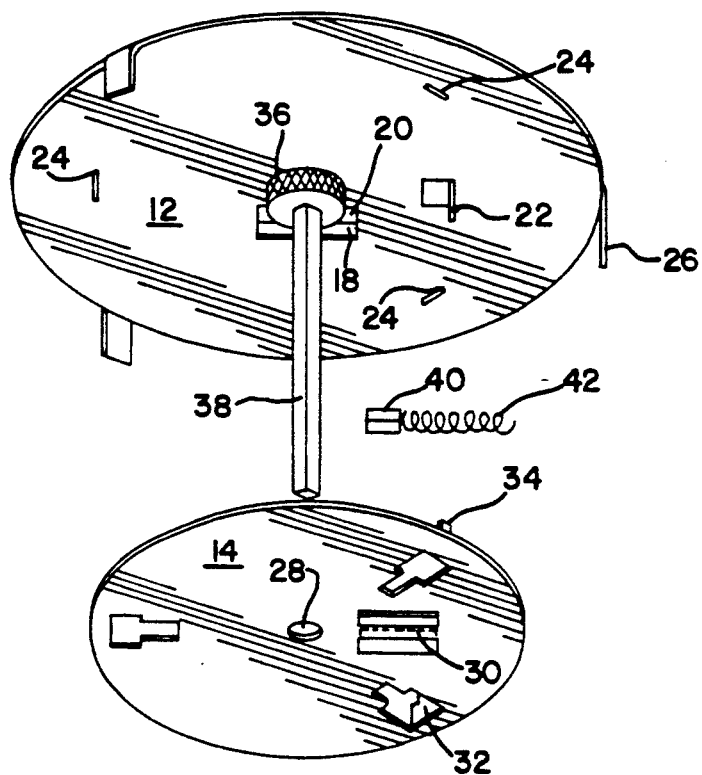
FIG. 2 is an exploded perspective view of part of the ignition system of the container shown in FIG. 1.

As best shown in FIG. 2, the ignition system includes two spaced parallel metal discs 12 and 14. The upper larger disc 12 supports the heat-generating material 72 (FIG. 1) on it, and has a central hole 16, a rectangular screen 18 and a rectangular opening 20. The opening is covered by the ignition agent 73.

The screen 18 and opening 20 are formed by cutting the disc 12 adjacent the central hole to form three sides of the opening 20 and bending the area so defined along the fourth side. The bent section forms the screen 18 and it extends from the outer longer side of opening 20 downwardly or toward the disc 14 at an angle of about 45 degrees toward the central hole 16.

The disc 12 also has a lug 22 formed in a similar manner by making three cuts in the disc 12 and bending the cut section downwardly. The disc 12 further has slots 24, and peripheral tongues 26 bent downwardly. The lug 22 faces along a radius of the disc 12 which extends in parallel with the long dimension of screen 18 and opening 20.

The lower smaller disc 14 has a central hole 28 formed in it, and two parallel holding walls 30 formed by cutting the disc adjacent the central hole and bending the sections upwardly towards the disc 12. The walls 30 extend adjacent and on opposite sides of a radius of the disc 14.

The lower disc 14 further has spacers 32 formed by cutting the disc 14 and bending the cut sections upwardly. Each spacer tab 32 is formed with a top nail section 34 which extends through one of slots 24 and is bent over in order to secure the discs 12 and 14 together. The shoulders formed by the nails 34 form stops in order to space the two discs.

A sparking wheel 36 has an cylindrical abrasive surface and is secured to a vertical shaft 38 near the upper end of the shaft. The shaft 38 is supported rotatably by the central disc holes 16 and 28 and extends downwardly rotatably through the insulator 74, the compressing cover 76 and the bottom plate 60. The wheel 36 is rotatably interposed between the two discs 12 and 14. The lower sides of wheel 36 and screen 20 are close to each other.

The two discs are secured together such that the two walls 30 are on opposite sides of the radius between the wheel 36 and the lug 22. The flint 40 and spring 42 are held in the space formed by the discs 12 and 14, the lug 22, the walls 30 and wheel 36. The flint 40 is pressed against the abrasive surface of the wheel 36 by the spring 42.

To the lower end of shaft 38 is fixed a bevel gear or a face gear 78, which meshes with another bevel or face gear 80 fixed to a horizontal shaft 82. The shaft 82 is supported rotatably by a support 84 fixed inside the bottom cover 61, and extends to outside through the side wall of cover 61. The outer end of shaft 82 has a handle 86.

For operation, the top cover 58 is removed. The handle 86 is turned clockwise to rotate the shafts 82 and 38 and wheel 36, generating sparks which are directed upwardly through the opening 20 by the angled screen 18. The sparks fire the ignition agent 73, which then fires the heat-generating material 72 to heat the beverage 57.

Figure 3:
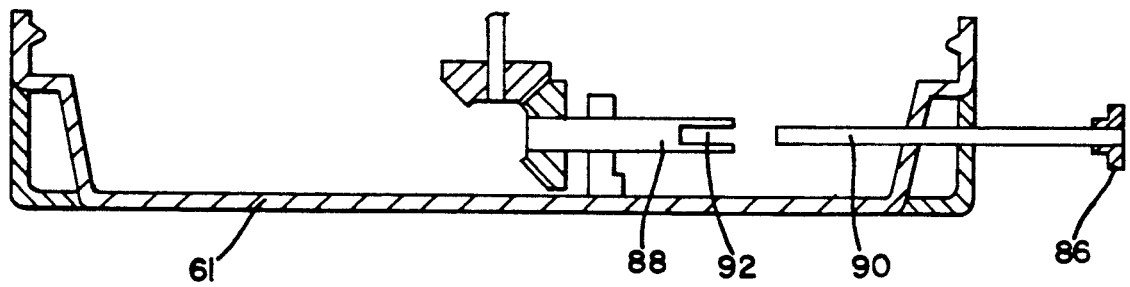
FIG. 3 is a fragmentary view in vertical section of an alternative feature of an ignition system.

As shown in FIG. 3, the horizontal shaft may in an alternative arrangement be separated into a pair of aligned inner and outer shafts 88 and 90. The inner shaft 88 has an outer axial end opening 92 which is polygonal in radial cross section. The outer shaft 90 has an inner polygonal end for rotating engagement with the end opening 92 and a handle 86 at the outer end.

The outer shaft 90 is normally kept outside the bottom cover 61 against accidental or unintended operation of the heater. In operation, the outer shaft 90 is inserted into the cover 61 for engagement with the inner shaft 88.

An ignition system for a self-heating container and a self-heating container including such an ignition system is described, illustrated and claimed in our copending European Patent Application No. 90301896.8. That ignition system includes a metal plate to which is journalled a shaft carrying a sparking wheel which can be rotated against a flint supported by the plate in order to generate sparks. A screen on the plate adjacent the wheel and flint deflects the sparks through an opening to ignite a heat-generating material against which the plate can be disposed. The shaft can be keyed to a spring by means of which it can be rotated for spark generation.

However, the above copending application does not describe a self-heating container of the type described and claimed herein including a horizontal shaft by means of which the shaft carrying the sparking wheel can be rotated.

What is claimed:

1. A self-heating container comprising an outer casing (56) having a bottom wall (60), an inner casing (64) secured within sad outer casing and including a wall (12), an ignition agent (73) mounted in said inner casing (64) adjacent said wall (12), a heat-generating material (72) contained in said inner casing adjacent said ignition agent (73), a vertical shaft (38) journalled within the inner casing and having a lower end extending out of said bottom wall of said outer casing, a sparking wheel (36) having an abrasive surface and secured to said vertical shaft adjacent said heat-generating material, and a flint (40) supported by said wall of said inner casing and pressed against said abrasive surface to generate sparks when said wheel is caused to rotate, characterized by a horizontal shaft (82, 88) journalled to said outer casing and adapted to be rotated, and gear means (78, 80) for coupling said vertical shaft (38) and said horizontal shaft (82, 88).

2. A container according to claim 1, wherein the horizontal shaft (82) extends out of the outer casing.

3. A container according to claim 1, wherein the horizontal shaft (88) has an axial hole (92) of noncircular in cross section, wherein there is provided also a key shaft (90) having an inner end adapted to be inserted rotatably into the outer casing in axial alignment with the horizontal shaft for the rotating engagement with the axial hole.

4. A container according to claim 1, and further including thermal insulation means (74) within said outer casing (56), said insulation means extending around said vertical shaft (38) and between said heat-generating material (72) and said bottom wall (60) of said outer casing (56).

* * * * *